No. 784,041. PATENTED MAR. 7, 1905.
W. H. FORD.
MOLD CUTTER.
APPLICATION FILED NOV. 30, 1900.

Witnesses.
Thomas Drummond
A. B. Kaiser

Inventor.
William H. Ford,
by Crosby Gregory
Attys.

No. 784,041.                                              Patented March 7, 1905.

UNITED STATES PATENT OFFICE.

WILLIAM HENRY FORD, OF LOWELL, MASSACHUSETTS, ASSIGNOR TO RINGSET COMPANY, OF BOSTON, MASSACHUSETTS, A CORPORATION OF MAINE.

MOLD-CUTTER.

SPECIFICATION forming part of Letters Patent No. 784,041, dated March 7, 1905.

Application filed November 30, 1900. Serial No. 38,270.

*To all whom it may concern:*

Be it known that I, WILLIAM HENRY FORD, a citizen of the United States, residing at Lowell, county of Essex, State of Massachusetts, have invented an Improvement in Mold-Cutters, of which the following description, in connection with the accompanying drawings, is a specification, like characters on the drawings representing like parts.

This invention has for its object the production of a novel device to cut mold spaces or cavities in charcoal or like soft material in which to cast articles—such for instance, as, finger-rings.

In the device herein to be described the mold material may be engaged outside the part of said material where the mold-space is to be cut, and the circular mold-space may be cut by a tool located eccentrically to the longitudinal axis of its carrying shaft or spindle, the adjustment of the tool, preferably held in a tool-carrier at right angles to the longitudinal axis of the said shaft or spindle, providing for the cutting of annular cavities of different diameters. The depth of the cavity is also controlled, it may be, by or through a suitable stop to be described, or by contact of the end of the shaft or spindle with the mold material. In some instances I find it desirable to insert in the mold material at the center of the mold-space a bushing to be entered by a pin extended from the end of the shaft or spindle, said pin and bushing acting in a measure to steady the mold material, the bushing serving to receive a pin or device when centering two mold-halves in position to receive the molten metal in their alined mold-spaces. The employment of the bushing prevents any enlargement of the hole in the coal, and thereby insures that the mold parts when put together with their mold-spaces in contact will exactly aline one with the other; otherwise a correct ring could not be cast.

Figure 1:
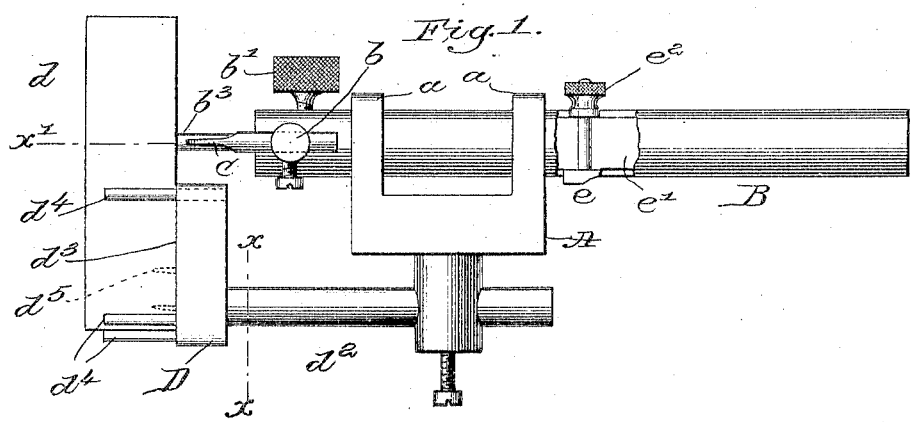
Figure 2:
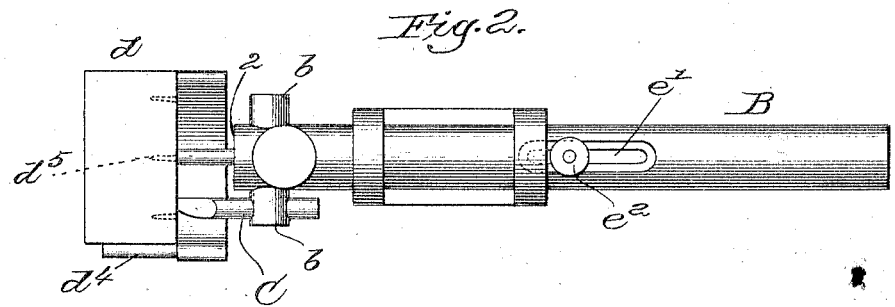
Figures 3, 4:
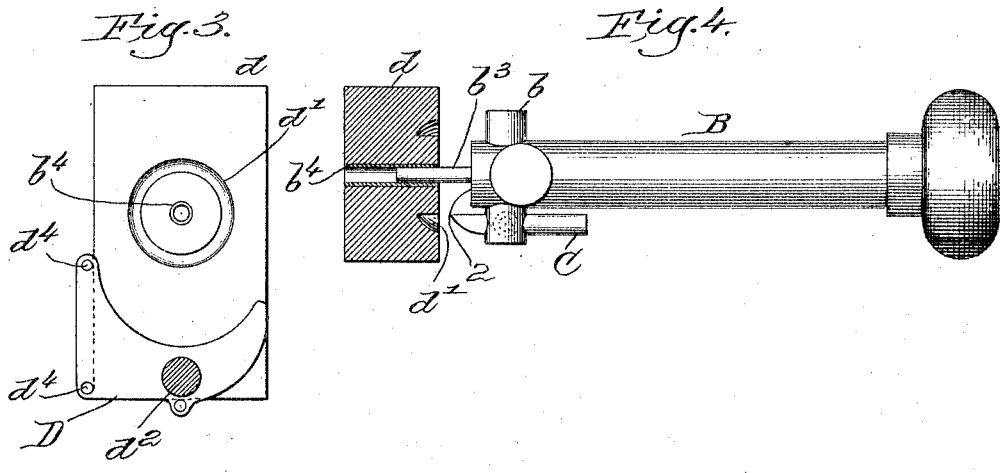

Figure 1, in elevation, shows my improved mold-cutting apparatus with a piece of mold material in position to be cut. Fig. 2 is a view looking at the apparatus from a different point, the cutter having entered somewhat the face of the mold material to cut a mold-space therein. Fig. 3 is a view to the left of the section-line $x$, showing the mold material as having been provided with a mold-space. Fig. 4 shows the mold material in section in the line $x'$, Fig. 1, the support and the block being omitted.

In the drawings, A represents a block having suitable bored ears $a$, which receive loosely a shaft or spindle B, represented as bored transversely at a short distance from one end to receive a tool-carrier $b$, shown as adjustable at right angles to the longitudinal axis of the shaft or spindle. Said carrier may be confined in its adjusted position by a suitable set-screw $b'$. The tool-carrier is adapted to receive the shank of a tool C, having its acting end shaped to cut in the mold material an annular groove having side walls shaped to correspond in form with the form desired for the inner and outer faces of the circular casting, as a ring, to be produced by filling the mold-space with molten metal. The tool, it will be understood, is located eccentrically with relation to the longitudinal axis of the shaft or spindle, and the degree of eccentricity of the tool may be varied by adjusting it toward and from the longitudinal axis of the shaft or spindle, and this adjustment may be effected by or through moving the tool-carrier in the shaft or spindle. The tool may be placed in any desired position, according to the diameter desired for the mold-space to be cut. The end of the spindle has a central bore which may receive a pin $b^3$.

The mold material $d$, preferably of charcoal, has that side of it which is to be provided with the mold-space $d'$ cut to present a plane surface, and in practice the mold material will preferably be bored at right angles to said face, and a bushing $b^4$, of metal, will be inserted in the hole so formed, and this bushing and hole will occupy a position exactly central with relation to the mold-space. This bushing will receive a pin employed to unite the two mold-halves, and the employment of the bushing obviates any wear of the hole which might tend to prevent the true and proper alinement of the mold-spaces that casting may be done in the alined spaces.

The block A, as herein represented, has a hole to receive the shank $d^2$ of a support D, so that said support during the operation of cutting a mold-space may be maintained firmly in position with relation to the shaft or spindle carrying the cutting-tool. The support D has its face $d^3$, against which is applied the side of the mold material in which is to be cut the mold-space, exactly at right angles to the longitudinal axis of the shaft or spindle carrying the tool, such position of the support with relation to the shaft or tool insuring the formation of the mold-space correctly and the cutting of the groove therein to exactly the proper depth from the face of the mold material.

The mold material should be so sustained that it will not slide or tip with relation to the longitudinal axis of the shaft or spindle B during the time that the mold-space is being cut therein, and to insure this I have provided the support D with means to act against the side walls of the mold material, said means, as herein represented, being pins $d^4$, and to further prevent any possibility of the mold material tipping the support is provided with a plurality of prongs $d^5$, said pins and prongs engaging the mold material outside of the point where the tool enters the mold material to cut the mold-space.

I prefer that the support and spindle be relatively fixed in the same block; but this is not a necessity of my invention, and the support holding the coal may be otherwise sustained.

The stud $b^3$ at the end of the shaft or spindle will preferably be fixed thereto, and consequently it will turn in the bushing, before described, inserted in the coal and the bushing will prevent any enlargement of the hole which otherwise would occur, and therefore prevent the proper centering of the two mold-halves with relation each to the other. With the bushing in the mold material the latter may be held in one hand and the spindle in the other, and with the stud $b^3$ entering the bushing the spindle may be rotated to complete, if desired, the mold-space.

To provide a piece of mold material with a mold-space, the side walls of the material may be pressed against the studs $d^4$, and the face of the material which is to be cut in the formation of the mold-space may be impaled on the prongs $d^5$, the face of the material taking a seat on a face at the support D. The tool having been properly adjusted eccentrically with relation to the shaft or spindle for moving it, the end of the tool will be put in contact with the face of the mold material, and by a rotation of either the shaft or spindle or the mold material an annular groove will be cut in the mold material, and the depth of this groove may be determined by an adjustable stud $e$ contacting with the block A, said stud being held in a slot $e'$, made in the shaft or spindle, said stud being confined in any desired position by means of a suitable clamping-nut $e^2$ or by the contact of the end 2 of the shaft or spindle with the face of the coal.

Having described my invention, what I claim, and desire to secure by Letters Patent, is—

1. A device for forming finger-ring molds, comprising a shaft or spindle, a support to receive and sustain part of the face, end, and side edges of mold material to restrain the rotation thereof, a tool disposed eccentrically with relation to the longitudinal axis of said shaft or spindle to cut a mold-groove in the mold material, and means to regulate the depth of the mold-groove.

2. A device for forming finger-ring molds, comprising a rotatable shaft or spindle, a tool carried thereby to cut a circular groove in the face of a block of mold material, a support to engage the face of the mold material and also an edge thereof, and means to stop the cutting action of said tool before the mold-groove has been cut entirely through said material.

3. A device for forming finger-ring molds, comprising a support for mold material, said support contacting with the face and edge of a block of mold material, a guide engaging said support, a stud extended beyond the end of said shaft or spindle and concentric with the longitudinal axis thereof, a cutting-tool substantially parallel with said stud and adjustably sustained by said shaft, said tool acting to cut a groove in one face of the mold material while the relative positions of said support and spindle are changed in the direction of the longitudinal axis of the spindle, and the spindle is being rotated.

4. In a device for forming finger-ring molds, a rotatable shaft or spindle having an axially-extended guiding-pin to enter a hole bored in a block of mold material, and having an opening at right angles to the longitudinal axis of said pin and shaft or spindle, an adjustable cutter, and means to adjust and sustain said cutter at a greater or less distance from the longitudinal axis of said shaft or spindle according to the diameter of the groove to be cut in mold material, said cutter being adjustable with relation to the end of said spindle according to the depth of the groove to be cut in the mold material.

5. In a device for forming finger-ring molds, means to sustain and abut against one face and the edge of, and prevent the rotation of, a block of mold material, a rotatable shaft or spindle, a cutter adjustably sustained on and rotatable with said shaft or spindle, said cutter presenting a cutting-point shaped to correspond with the cross-section of the mold-groove to be cut, and means to determine the extent of relative longitudinal movement between the means acting against the face of said mold material and cutter, to enable the mold-groove to be cut but partially through said mold material.

6. A device for forming finger-ring molds, comprising a shaft or spindle having projecting from its end centrally a pin of reduced diameter to leave the end of the spindle free to contact with the face of mold material in which said pin enters, said spindle having a hole therethrough at right angles to its longitudinal axis and to the longitudinal axis of the pin, an adjustable cutter-carrier located in said hole and provided with a cutter which is adjustable longitudinally in said cutter-carrier so that the cutting end of the cutter may be made to project beyond the end of the spindle for just the depth of one-half the mold-groove to be cut.

In testimony whereof I have signed my name to this specification in the presence of two subscribing witnesses.

WILLIAM HENRY FORD.

Witnesses:
   GEO. W. GREGORY,
   EDITH STODDARD.